(No Model.)

S. H. EWING.
MACHINE FOR STUFFING HORSE COLLARS.

No. 393,822. Patented Dec. 4, 1888.

WITNESSES
M. G. Loefler.
W. K. Leveridge.

INVENTOR
Samuel H. Ewing
by Jno. D. Boone
atty

N. PETERS, Photo-Lithographer, Washington, D. C.

UNITED STATES PATENT OFFICE.

SAMUEL H. EWING, OF SAN FRANCISCO, CALIFORNIA.

MACHINE FOR STUFFING HORSE-COLLARS.

SPECIFICATION forming part of Letters Patent No. 393,822, dated December 4, 1888.

Application filed June 14, 1888. Serial No. 277,145. (No model.)

*To all whom it may concern:*

Be it known that I, SAMUEL H. EWING, of the city and county of San Francisco, State of California, have invented an Improvement in Machines for Stuffing Horse-Collars; and I do hereby declare that the following is a full, clear, and exact description thereof.

My invention relates to certain improvements in the construction and operation of machines for stuffing the rims of horse-collars; and it consists, first, of a simple mechanism whereby the straw is fed from the hopper and delivered to the stuffing-rod by a direct movement, and, secondly, in a peculiar gripping device for holding the collar while its rim is being stuffed.

Figure 1:
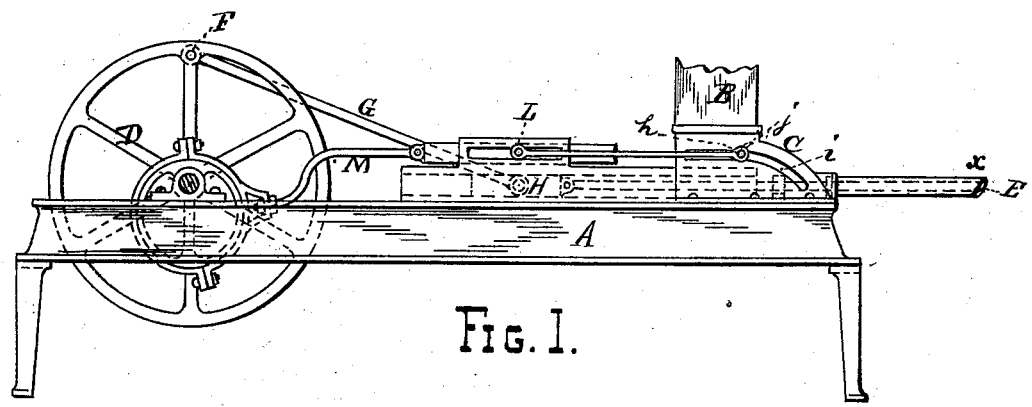
Figure 2:
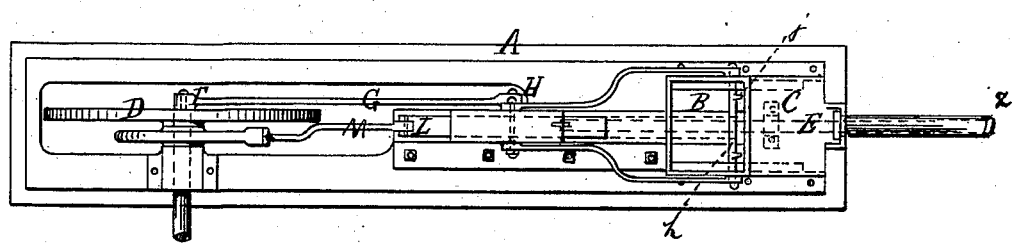
Figure 4:
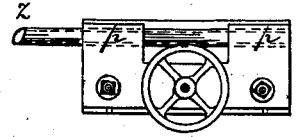
Figure 6:
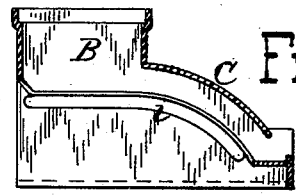
Figure 3:
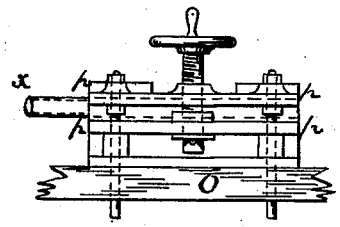
Figure 5:
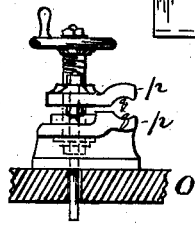
Figure 7:
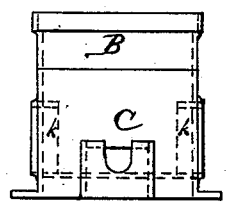
Figure 8:
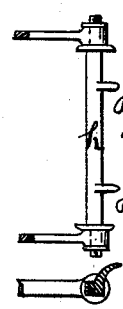

Referring to the accompanying drawings, Figure 1 is a side elevation of the machine. Fig. 2 is a plan of the machine. Fig. 3 is a plan view of the gripping device. Fig. 4 is a side elevation of the gripping device. Fig. 5 is a transverse end section of the gripping device. Fig. 6 is a side view of the lower part of the hopper, showing the downward and forward passage and the side guide-grooves for the transverse feed-rod. Fig. 7 is a front view of the lower part of the hopper, showing an opening through which the stuffing-rod passes. Fig. 8 shows the feed-bar with its hooks and connections.

A represents the frame or table, on one end of which is placed the hopper B, in which the straw for stuffing the collar is contained. The lower part of this hopper is preferably made of cast-iron, with a curved enlargement, C, on its front side, which extends down to the table, as represented at Fig. 6. The driving-wheel D, from which the feeding and stuffing mechanism are driven, is mounted at the opposite end of the table.

The bottom or floor of hopper B extends horizontally across the hopper to near the point where the enlargement C commences, and then it is curved downward parallel with the curved front of the enlargement, so as to form a curved passage-way leading from the bottom of the hopper down to the point where the stuffing-rod passes.

The stuffing-rod E is driven from a wrist-pin, F, on the rim of the driving-wheel D. A pitman, G, connects this pin with a cross-head, H, which moves on the horizontal bed of the table, so that the rod which extends forward from the cross-head passes below the floor of the hopper and out through an opening in its curved front, as shown at Fig. 7, so that in making its stroke it passes across the curved passage-way above mentioned.

The feeding device consists of a rod, $h$, which is mounted transversely across the lower portion of the hopper just below its floor. A groove, $i$, is made in each side of the box, just underneath its floor or bottom, and these grooves follow the curve of the curved portion of the floor. The ends of rod $h$ enter and move in these grooves, so that when the rod is driven back and forward it will follow these grooves as guides and travel just underneath the floor. The rod $h$ has one or more hooks or curved fingers, $j$, which pass up through slots $k$ in the floor, as shown at Figs. 7 and 8, for the purpose of taking a portion of straw from the bottom of the hopper and carrying it down to the stuffing-rod at each stroke of the machine. This rod $h$ is driven from a cross-head, L, and the cross-head is driven by a pitman, M, from an eccentric on the shaft of the driving-wheel D. It will be noticed that the feeding mechanism is driven by a direct motion from the cross-head L, and that at each stroke the rod $h$, with its hooks or fingers, moves across the horizontal portion of the floor and then down the curved portion, so that its hooks or fingers, projecting upward through the floor, will carry a portion of straw from the bottom of the hopper down through the curved passage and present it to the stuffing-rod as it passes across the passage toward the horse-collar. In passing back again the curved fingers pass underneath the straw without disturbing it.

The gripping device in which the horse-collar is held while its rim is being stuffed is placed directly in front of the machine in line with the stuffing-rod. This grip is mounted horizontally on the side of a beam or frame, O, so that it extends out on one side of the beam. It consists of two jaws, $p\ p$, like the jaws of a vise, which are closed and opened with a hand-wheel and screw, as shown. The jaws extend upward, preferably, and have grooves $q\ q$ made in them of sufficient capacity to surround the rim of the horse-collar and clasp it between the rim and body of the collar, so that the rim can be stuffed through the grooves. The collar is kept straight and lengthened out during the process of stuffing its rim, and the body of the collar is above the vise, as shown at Figs. 3 and 5. In this position the stuffing-tube enters one end of the rim, and the stuffing is proceeded with until the entire rim is stuffed. By this means of gripping and holding the collar the entire rim can be stuffed without disturbing the collar. The stuffing-rod passes through the gripped portion of the collar, and the collar slides on its table as it is stuffed and driven forward through the grip by the force of the stuffing-rod.

Having thus described my invention, what I claim, and desire to secure by Letters Patent, is—

1. In a horse-collar-stuffing machine, the hopper B, having a curved passage-way leading from its bottom forward and downward, in combination with a direct-acting feeding device consisting of a traveler, $h$, guided underneath the floor by grooves in the sides of the hopper, and having hooks or curved fingers $j$, projecting upward through slots $k$ in the floor of the hopper, substantially as specified.

2. In a horse-collar-stuffing machine, a gripping device for holding the rim of the collar while it is being stuffed, consisting of two jaws, $p\ p$, arranged to surround the rim of the collar and grip the neck which connects the rim and body of the collar on opposite sides with sufficient pressure to allow the rim to be driven forward through the grip by the force of the stuffing-rod as fast as it is stuffed, substantially as described.

In witness whereof I have hereunto set my hand.

SAMUEL H. EWING.

Witnesses:
JAMES L. KING,
M. G. LOEFLER.